United States Patent [19]

Conrad

[11] Patent Number: 4,832,186
[45] Date of Patent: May 23, 1989

[54] CONVEYOR TRACKING ROLLER HAVING HELICAL GUIDES WITH VARIABLE PITCH

[75] Inventor: Rene A. Conrad, San Mateo, Calif.

[73] Assignee: Dynapower Corporation, Stockton, Calif.

[21] Appl. No.: 182,634

[22] Filed: Apr. 18, 1988

[51] Int. Cl.⁴ .............................................. B65G 15/64
[52] U.S. Cl. .................................... 198/840; 198/806; 474/122; 29/121.4
[58] Field of Search ............... 198/806, 669, 807, 660, 198/808, 840, 498; 474/119-122, 184, 187-189; 29/126-128, 121.1-121.4

[56] References Cited

U.S. PATENT DOCUMENTS

| | | | |
|---|---|---|---|
| 3,342,311 | 9/1967 | Robins | 198/806 |
| 3,713,348 | 1/1973 | Conrad et al. | 474/187 |
| 3,812,732 | 5/1974 | Conrad | 474/189 X |
| 3,972,414 | 8/1976 | Conrad | 198/840 X |
| 4,140,216 | 2/1979 | Conrad | 198/840 X |
| 4,592,463 | 6/1986 | Puskar | 198/840 X |

Primary Examiner—Robert J. Spar
Assistant Examiner—Lyle K. Kimms
Attorney, Agent, or Firm—Rosenblum, Parish & Bacigalupi

[57] ABSTRACT

A conveyor belt system having an improved pulley is disclosed in which the improved pulley includes a roller having grooves of varying width machined into the cylindrical surface of the roller to form raised guides or lands of equal width therebetween which spiral outward relative to the center of the roller with decreasing pitch. The contacting surface of the guides is operative to engage a conveyor belt or webbing passing over the pulley and the varying pitch of the guides allows for the quick centering of unaligned belts or webs. The roller may be machined to have more than one helical guide spiralling outward from the center of the cylindrical surface of the roller at one time. The guides may be squared, chamfered or rounded and may optionally contain serrations. The roller may additionally be machined to taper slightly from its center to the respective ends thereof. Alternatively, helical grooves of equal width may be formed in place of the guides in the surface of the roller and inlaid with conveyor web engaging ribbing material which will contact the conveyor web and center it with respect to the roller and pulley.

31 Claims, 5 Drawing Sheets

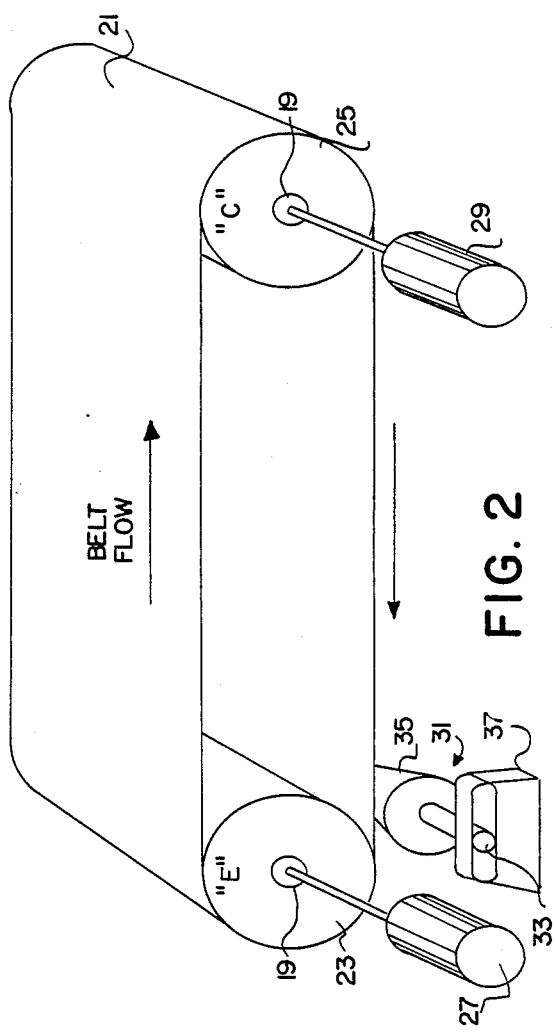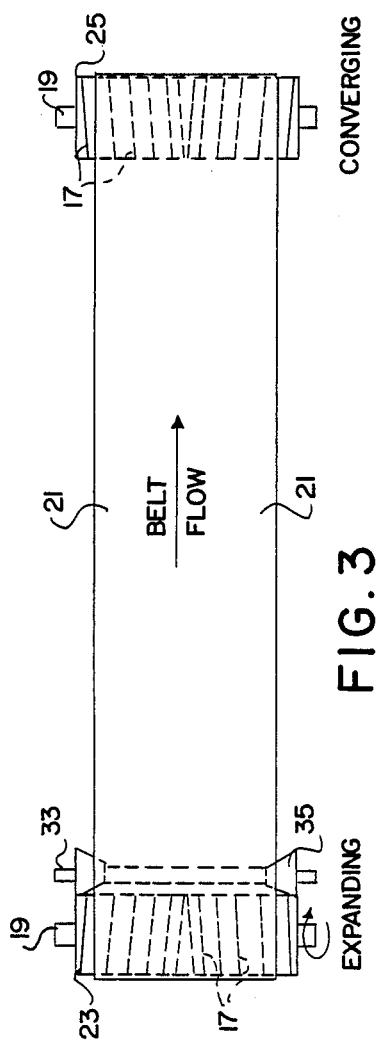

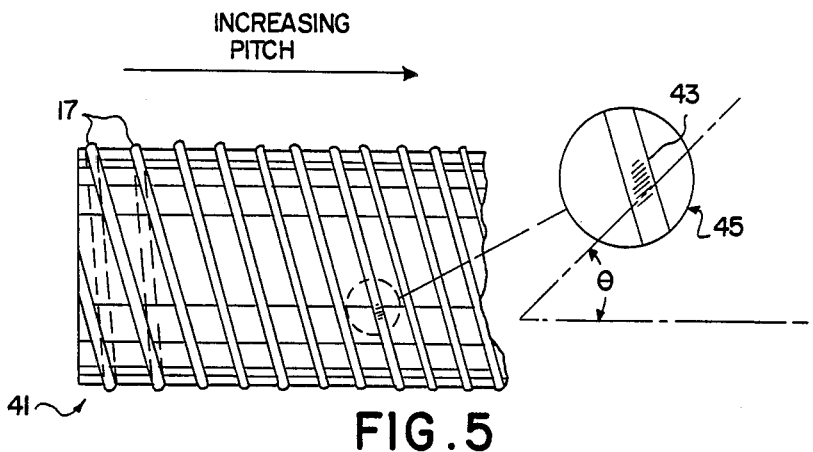
FIG. 5
FIG. 6b
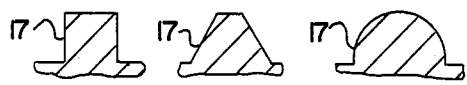
FIG. 6a   FIG. 6c
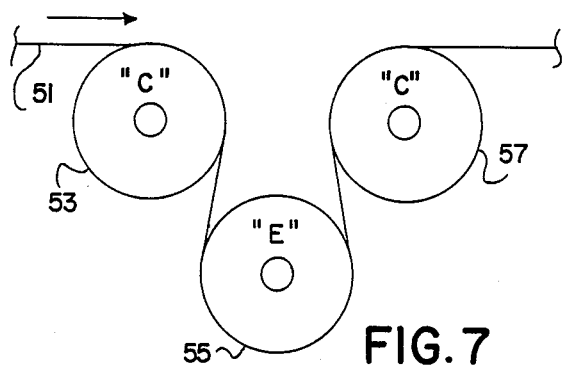
FIG. 7

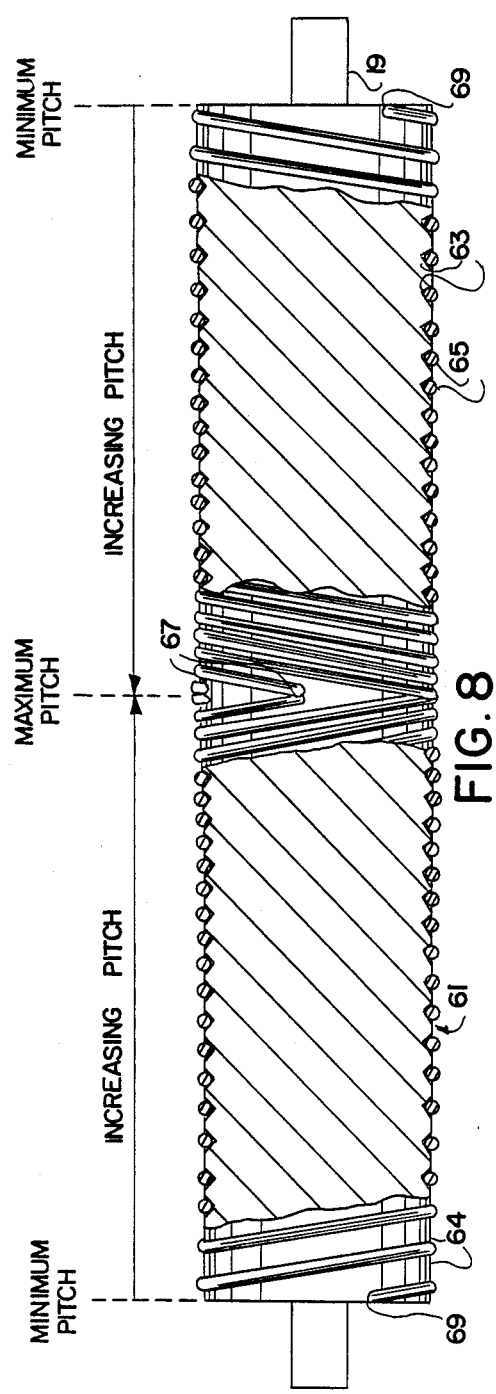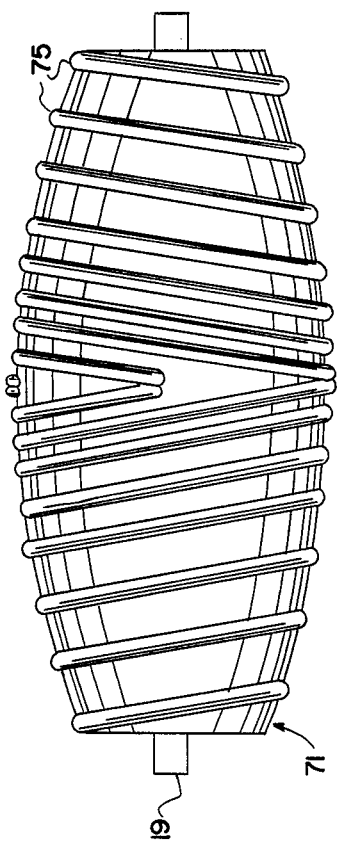

CONVEYOR TRACKING ROLLER HAVING HELICAL GUIDES WITH VARIABLE PITCH

BACKGROUND OF THE INVENTION

1. Field of the Invention

The present invention relates generally to belt aligning and tracking rollers for conveyor belt systems and more particularly to an improved tracking roller having variable pitch helical guides for providing faster tracking ability.

2. Description of Prior Art

Maintaining the alignment of conveyor webs or belt shaped materials over rollers or pulleys has been a universal problem. Tracking rollers having helical grooves or ribbing which significantly improve tracking have been disclosed in my earlier U.S. Pat. Nos. 4,140,216; 3,972,414; 3,859,865; 3,812,732; and 3,713,348. These and other developments in conveyor systems have shown that helical ribbing or grooves along the cylindrical surface of the rollers can be an effective way to improve tracking. Although such ribbing or grooves have improved the tracking ability of these rollers, they have not always increased the realignment rate.

Solutions for improving the realignment rate of tracking rollers have not been significant. One approach to solving the problem has been to use some type of limiter to urge the belt in a certain direction once the belt has moved to a limit position. Although this approach can be helpful in quickly correcting a misaligned belt, it can also cause extensive damage to the edges of the belt or the material travelling over the rollers. In addition, some materials are simply too thin to be realigned in such a fashion. A second approach has been to increase the angle at which the grooves or ribbing are aligned with respect to the circumference of the roller. By increasing the angle at which the helical grooves or ribbing track inward, the speed at which the belt tracks inward can be increased. However, tracking speed can only be increased a limited amount with this approach because once the angle becomes too great the grooves approach being perpendicular to the direction of the belt across the roller, which can result in a loss of all tracking ability.

SUMMARY OF THE PRESENT INVENTION

It is therefore a primary objective of the present invention to provide an improved tracking roller with faster tracking ability.

Another object of the present invention is to provide an improved tracking roller whose tracking speed is proportional to the variation in pitch of helical guides formed in the circumference of the roller.

Still another object of the present invention is to provide a fast tracking roller which can be used for tracking all types of metal, cloth, paper, plastic, woven wire, wire mesh, or other flexible materials which are commonly transported over rollers.

A further object of the present invention is to provide tracking rollers capable of applying tracking forces which increase in proportion to the degree of belt misalignment.

Still another object of the present invention is to provide a fast tracking roller which can be fitted with a variety of differently shaped helical guides.

Briefly, a preferred embodiment of the present invention includes a conveyor belt system having an improved roller formed out of steel, plastic, hard-coated aluminum, or similar materials having grooves machined into the cylindrical surface of the roller to form raised guides or lands therebetween which spiral outward relative to the center of the roller with decreasing pitch. The roller may be machined to have more than one helical guide spiralling helically outward from the center of the cylindrical surface of the roller at one time. The guides may be squared, chamfered or rounded and may optionally contain serrations. The roller may additionally be machined to taper slightly from its center to the respective ends thereof.

These and other objects and advantages of the present invention will no doubt become apparent to those skilled in the art after having read the following detailed description of the preferred embodiment which are contained in and illustrated by the various drawing figures.

BRIEF DESCRIPTION OF THE DRAWING

FIG. 2 is a diagram generally illustrating a closed-loop belt and roller system using tracking rollers constructed in accordance with the present invention;

FIG. 3 is an illustration of the conveyor belt depicted in FIG. 2 viewed from above the conveyor;

FIG. 5 is a partially broken elevational view of a tracking roller having serrated belt guides in accordance with the preferred embodiment of the present invention;

FIGS. 6a, 6b and 6c are cross-sectional views of three alternatively shaped belt guides which may be used in connection with the tracking roller of the present invention;

FIG. 7 is a diagram of a three roller open-loop continuous web system generally illustrating unwrinkling while tracking using tracking rollers in accordance with the present invention;

FIG. 8 is a partially broken, partially cross-sectioned, elevational view of a tracking roller having continuous variable pitch grooves inlaid with web engaging ribbing in accordance with a second alternative embodiment of the present invention;

FIG. 9 is an elevational view of a tracking roller in accordance with a third alternative embodiment of the present invention.

DETAILED DESCRIPTION OF THE PREFERRED EMBODIMENT

Figure 1:
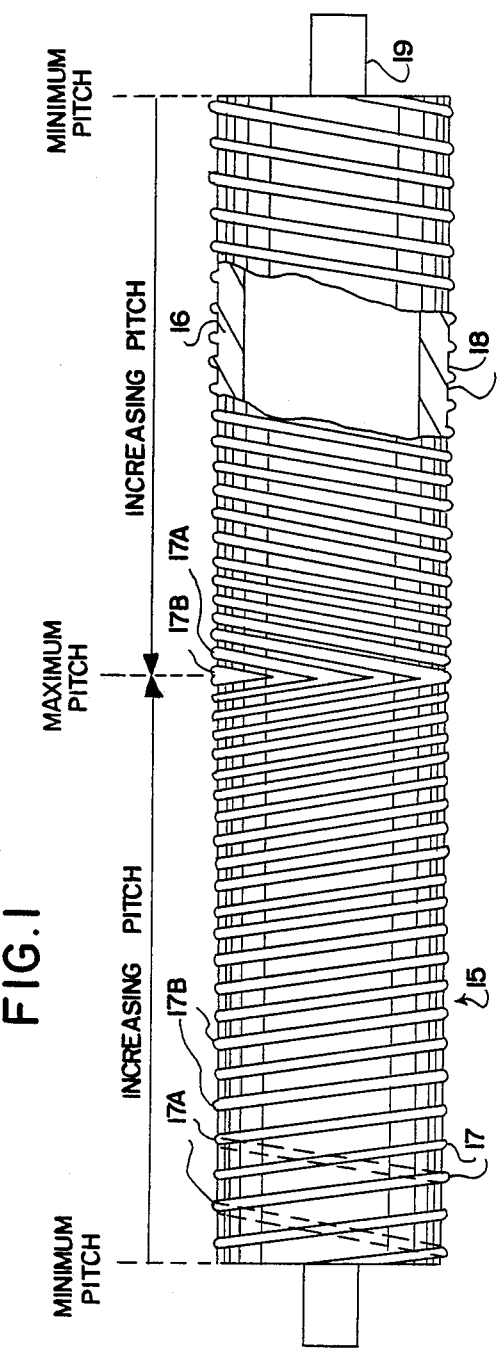
FIG. 1 is an elevational view of a tracking roller having continuous variable pitch guides in accordance with the preferred embodiment of the present invention.

Referring now to the drawing, a preferred embodiment of an improved conveyor pulley, or tracking roller, in accordance with the present invention is disclosed in FIG. 1. A tracking roller, shown generally by reference numeral 15, is formed out of a hollow shaft 16, although the shaft may also be solid. Shaft 16 can be constructed of either steel, plastic, hard-coated aluminum or any of a number of similar materials. The generally cylindrically shaped surface of shaft 16 is then machined with a numerically controlled tooling machine to create the helically shaped lands, or belt guides 17. Tracking roller 15 may be of either the cylindrical or tapered type. The belt guides 17 continuously decrease in pitch as they approach the ends of the tracking roller 15.

Pitch is a measure of the number of times a belt guide 17 encircles the circumference of a roller per inch in length of the roller. Thus, is the guides continuously decrease in pitch as they approach the ends of the roller, there are fewer belt guide loops or windings per inch in length of the tracking roller at its ends. Tooling machines capable of economically creating tracking rollers of the type disclosed herein have only recently been developed. In the process of making the belt guides 17, grooves 18 are formed in the cylindrical surface of the tracking roller 15, leaving lands therebetween forming the belt guides 17.

Belt guides 17 may be formed as single, double or triple helixes, etc. For example, in FIG. 1, two belt guides 17 are shown for each half of the cylindrical portion of tracking roller 15. Belt guides 17A and 17B are formed to start at the center of the cylindrical portion of tracking roller 15 and then spiral outward toward the two ends of tracking roller 15. Belt guides 17A and 17B thereby form a pair of dual helixes, in parallel, spiraling oppositely outward around each half of the cylindrical portion of tracking roller 15. Tracking roller 15 is also equipped with end pins 19 which support tracking roller 15 and allow it to rotate.

The pitch of the belt guides 17 is greatest at the center of tracking roller 15 and lowest at the tracking roller's two cylindrical ends. Hence, the pitch of the belt guides 17 continuously increases as the belt guides approach the center of tracking roller 15. This continuous variation in pitch provides a number of advantages over prior art rollers with uniformly spaced belt guides or grooves. Primarily, a continuously varying pitch in the belt guides will cause misaligned conveyor belts or material travelling over the belt to track faster into alignment than would be possible with ordinarily spaced belt guides.

Although prior art methods of increasing the angular arrangement of the guides or grooves on the surface of the roller could result in some improvement in tracking speed, increased speed would be gained at the sacrifice of belt traction. This occurs because increasing the angle of the guides affects the amount of time during which the belt can follow a single belt guide. If the guides are set at too large of an angle with respect to the circumference of the roller, the belt would simply pass over the guide rather than follow the guide. By utilizing continuously varying pitch guides on the tracking roller, however, it is possible to achieve faster tracking speeds with less loss of belt traction. A pitch of 4 at the center decreasing to a pitch of 1½ at the ends of the roller are preferred pitch settings for the particular tracking roller illustrated.

Referring now to FIG. 2, a closed-loop conveyor belt system having tracking rollers in accordance with the present invention is depicted. Webbing material or belt 21, which can be metal, cloth, paper, plastic, woven wire, wire mesh, or a similar flexible material, rolls across the cylindrical surface of expanding tracking roller 23, denoted by an "E," to converging tracking roller 25, denoted by a "C," and then back to expanding tracking roller 23. Both expanding tracking roller 23 and converging tracking roller 23 are constructed similar to tracking roller 15 of FIG. 1. However, expanding tracking roller 23 and converging tracking roller 25 are oppositely aligned to one another, or turned at 180 degrees relative to each other end for end, so that the belt guides of expanding tracking roller 23 appear to move in an outward direction as they contact the web 21, while the belt guides of converging tracking roller 25 appear to move in an inward direction as they engage the web 21.

Motors 27 and 29 are connected to end pins 19 of tracking rollers 23 and 25, respectively, and rotate tracking rollers 23 and 25 in the same direction. A single motor could be connected to either tracking roller and still provide adequate power to allow the system to operate properly. The outward motion of the belt guides on expanding tracking roller 23 causes belt 21 to be centered and flattened across the surface of the roller. Likewise, the inward motion of converging tracking roller 25 causes belt 21 to be centered across the surface of the roller. Each tracking roller is able to affectively center the belt despite the direction of its rotation or orientation because of the forces which are exerted by each half of the rollers against the belt Overloading in the belt 21 can be reduced by an idler control shaft, shown generally by reference numeral 31, which provides additional directional forces to the belt 21 before the belt contacts expanding roller 23. In addition, use of control shaft 31 allows the direction of tee belt flow of the closed-loop conveyor system shown in FIG. 2 to be reversed. Control shaft 31 is comprised of a shaft 33, with ends which fit into an adjustment platform 37 so that the shaft 33 can be moved to and away from expanding roller 23, and two cone-shaped rollers 35, which are better shown in reference to FIG. 3. Rollers 35 tapper inward toward each and contact the edge of the belt along their sloping surfaces so as to urge belt 21 toward a centrally aligned position.

FIG. 3 is a top view of the closed-loop conveyor belt system of FIG. 2 further illustrating the alignment of the expanding and converging tracking rollers 23 and 25 respectively. Belt guides 17 of both rollers 23 and 25 are illustrated by the dashed lines drawn across the surface of each roller. If expanding tracking roller 23 was to be rotated in the clockwise direction shown in FIGS. 2 and 3, the lines representing the belt guides 17 would appear to expand from the center of the roller toward the ends of the roller. Likewise, if converging tracking roller 25 was to be rotated in the same direction as expanding tracking roller 23, the lines representing the belt guides 17 would appear to converge on the center of roller 25.

Figure 4:
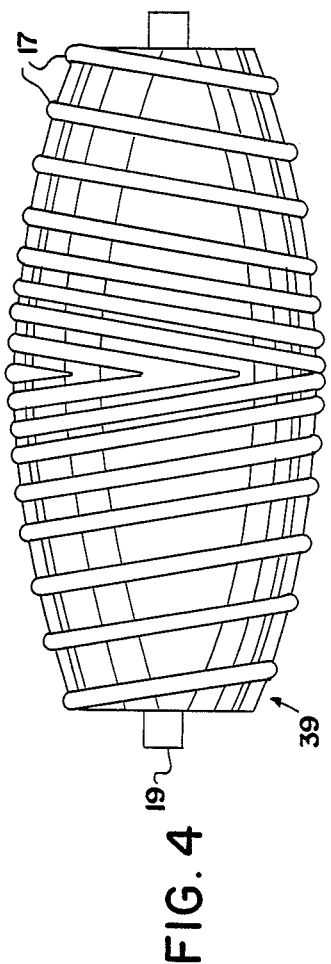
FIG. 4 is an elevational view of a tracking roller in accordance with a first alternative embodiment of the present invention.

A first alternative embodiment of a tracking roller is depicted in FIG. 4. Tracking roller 39 is similar to tracking roller 15 in most respects except that the ends of tracking roller 39 taper slightly with respect to the center of roller 39. Although the taper of tracking roller 39 is shown to be quite large in order to illustrate the tapering, the tapper from center to end may be as little as 0.03 inches. End pins 19 and belt guides 17 would be identical to the corresponding components of tracking roller 15. Tracking roller 39 is preferred for some applications because it causes the webbing material to straddle the roller about the center of the material and makes the material less likely to lose alignment.

A partially broken elevational view of a tracking roller 41 illustrating a single helix belt guide with serrations is shown in FIG. 5. A single helix belt guide on each half of the tracking roller can be used in place of double helix belt guides as described above. Part or all of the belt guides 17 may also be serrated across the surface to improve the traction between the webbing material or belt and the surface of the tracking roller, as is shown by serrations 43 in the enlarged segment shown at 45. Preferably, the angle, of the serrations relative to the axis of the tracking roller is about 45 degrees. However, the serration angle, be set at any angle which will improve the traction of the material passing over it.

Belt guides in accordance with the present invention may also be shaped in a variety of different ways, as is shown in FIGS. 6a, 6b and 6c. FIG. 6a depicts a cross-sectional view of a rectangularly shaped belt guide, FIG. 6b depicts a cross-sectional view of a chamfered belt guide, and FIG. 6c depicts a cross-sectional view of a rounded belt guide.

An embodiment of a three roller, open-loop, continuous web engaging system which accomplishes unwrinkling while tracking using rollers in accordance with the present invention is shown in FIG. 7. Wrinkles occurring in the web material are quite common and occur for a number of different reasons. These wrinkles can be a particularly big problem in open-loop systems conveying a continuous sheet of material, like newspaper.

The apparatus of FIG. 7 includes a continuous sheet of web material 51, two converging tracking rollers 53 and 57, and an expanding tracking roller 55. The axes of tracking rollers 53 and 57 are disposed above and on either side of the axis of tracking roller 55. Web material 51 passes first over tracking roller 53 at a 90 degree wrap, then under tracking roller 55 at a 80 degree wrap and finally over tracking roller 57 at a 90 degree wrap.

The helical guides of the rollers separate larger wrinkles into smaller wrinkles and then smooth out these smaller wrinkles during the process of centering and spreading the web material. Typically, a smaller variation in pitch of the belt guides will be used on the two converging tracking rollers than will be used on the expanding tracking roller. Although, a different combination of tracking rollers could be used, this combination is believed to achieve the best unwrinkling results.

A second alternative embodiment of a tracking roller 61 in accordance with the present invention is shown in FIG. 8. In this embodiment, web engaging ribbing is inlaid in varying pitch helical grooves 63, illustrated within the partial cross-section, which are machined into the cylindrical surface of tracking roller 61 in a helical pattern similar to the grooves used to create the helical lands of the preferred embodiment. However, the grooves 63 are machined to maintain a constant width and the spacing between each loop is varied. Thus, the lands 64 between grooves 63 increase in width as they lead from the center of tracking roller 61 to the ends thereof.

Inlaid within each continuous groove is a length of web engaging ribbing material 65. Ribbing material 65 is typically affixed at its ends to center points 67 and end points 69 of tracking roller 61. Ribbing material 65 may also be fixedly attached to grooves 63 in some appropriate manner, such as with a heat resistant adhesive. Ribbing material 65 should be thick enough in cross-section to extend to a predetermined height above the upper surface of lands 64 in order to promote contact between each coil of ribbing material and the conveyor web.

A third alternative embodiment of a tracking roller in accordance with the present invention is depicted in FIG. 9. Tracking roller 71 is substantially similar to tracking roller 61 of FIG. 8, and is configured with helical coils of web engaging ribbing material 75 inlaid in helical grooves. Tracking roller 75 is tapered at its ends with respect to its center in order to improve alignment and centering, and is similar in that respect to tracking roller 39 of FIG. 4.

Figure 10:
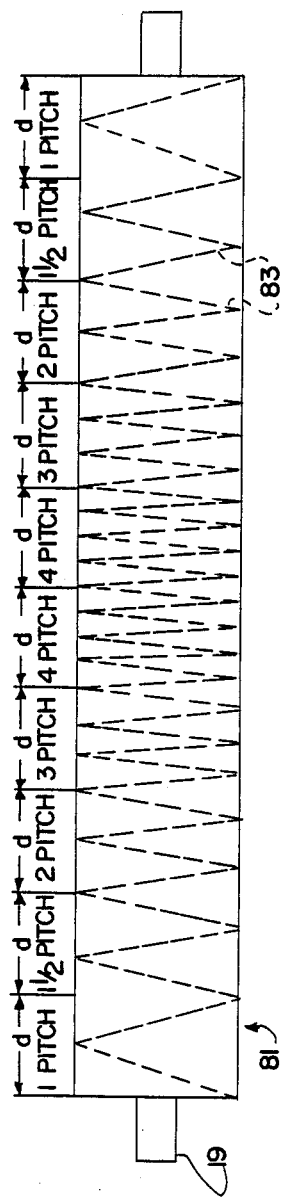
FIG. 10 is an illustration of a tracking roller having stepped pitch groves or ribbing in accordance with a fourth alternative embodiment of the present invention.

A fourth alternative embodiment of the present invention is illustrated in FIG. 10. Tracking roller 81, with end pins 19, is depicted as having stepped pitch groves or ribbing rather than continuously varying pitch grooves or ribbing. Tracking roller 81 is formed by machining a specific pitch in the surface of the roller for a predetermined distance, the instantaneously changing to another pitch, etc. For instance, tracking roller 81 is shown to have a pitch of 4, as shown by the dashed line 83 indicating the groves or ribbing, from its center for a distance, d, then a pitch of 3 for a distance, d, then a pitch of 2, then 1½, and ending with a pitch of 1 over the last segment of the roller. A variety of different pitches may be utilized and the distance between changes in pitch may also be varied as desired.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. In a conveyor system including a first pulley means and a second pulley means, a conveyor web supported by said first pulley means and said second pulley means and driven by at least one of said pulley means, and mean for rotating at least one of said pulley means to drive the web, an improved pulley means comprising:
   a generally cylindrical roller having helical lands formed in the outer surface thereof and spiralling from the center of the roller to the ends thereof with decreasing, pitch said helical lands being operative to engage said web and exert centering forces thereon tending to center said web relative to said pulley means.

2. An improved pulley means as recited in claim 1 wherein said roller has one helical land spiralling from the center of the roller to one end thereof and one helical land spiralling from the center of the roller to the other end thereof.

3. An improved pulley means as recited in claim 1 wherein said roller has two helical lands in parallel spiralling from the center of the roller to one end thereof and two helical lands in parallel spiralling from the center of the roller to the other end thereof.

4. An improved pulley means as recited in claim 1 wherein said roller tapers slightly from its center to the respective ends thereof.

5. An improved pulley means as recited in claim 1 wherein said helical lands are serrated to increase the frictional engagement between said roller and said web.

6. An improved pulley means as recited in claim 1 wherein said helical lands have a generally rectangular cross-section.

7. An improved pulley means as recited in claim 1 wherein said helical lands have a chamfered cross-section.

8. An improved pulley means as recited in claim 1 wherein said helical lands have a rounded cross-section.

9. An improved pulley means as recited in claim 1 wherein the surface configuration of said rollers is substantially similar and wherein one of said pulley means is turned end for end 180 degrees relative to the other of said pulley means so that when said pulley means rotate in the same direction said helical lands of said first pulley means appear to expand from the center of the roller and said helical lands of said second, pulley means appear to converge on the center of the roller.

10. An improved pulley means as recited in claim 9 further including a controller pulley means disposed proximate said pulley means and relative thereto such that said web engages said controller pulley means prior to engaging said pulley means, said controller pulley means being operative to engage said web and exert centering forces thereon tending to center said web relative to said controller pulley means.

11. An improved pulley means as recited in claim 10 wherein said controller pulley means may be adjustably disposed proximate said pulley means and relative thereto so as to increase or decrease said centering forces.

12. An improved pulley means as recited in claim 9 wherein said pulley means and said web are disposed relative to each other such that said web continuously engages at least 90 degrees of the surface of one of said pulley means and at least 180 degrees of the surface of the other said pulley means, and further including a third improved pulley means disposed proximate said pulley means and relative thereto such that said web continuously engages approximately 90 degrees of the surface of said third improved pulley means, and such that the helical lands of said third improved pulley means appear to converge on the center of the roller.

13. An improved pulley means as recited in claim 1 wherein said pulley means and said web are disposed relative to each other such that said web continuously engages at least 90 degrees of the surface of one of said pulley means and at least 180 degrees of the surface of the other said pulley means and further including a third improved pulley means disposed proximate said pulley means and relative thereto such that said web continuously engages approximately 90 degrees of the surface of said third improved pulley means.

14. An improved pulley means as recited in claim 1 wherein said pitch decreases in steps from the center of said roller to the ends thereof, each of said steps being defined by a predetermined distance.

15. An improved generally cylindrical roller having helical lands formed in the outer surface thereof and spiralling from the center of the roller to the ends thereof with decreasing pitch, said helical lands being operative to engage a conveyor web and exert centering forces thereon tending to center said web relative to said roller.

16. An improved roller as recited in claim 15 wherein said roller has one helical land spiralling from the center of the roller to one end thereof and one helical land spiralling from the center of the roller to the other end thereof.

17. An improved roller as recited in claim 15 wherein said roller has two helical lands in parallel spiralling from the center of the roller to one end thereof and two helical lands in parallel spiralling from the center of the roller to the other end thereof.

18. An improved roller as recited in claim 15 wherein said roller tapers slightly from its center to the respective ends thereof.

19. An improved roller as recited in claim 15 wherein said helical lands are serrated to increase the frictional engagement between said roller and said web.

20. An improved roller as recited in claim 15 wherein said helical lands have a generally rectangular cross-section.

21. An improved roller as recited in claim 15 wherein said helical lands have a chamfered cross-section.

22. An improved roller as recited in claim 15 wherein said helical lands have a rounded cross-section.

23. An improved pulley means as recited in claim 15 wherein said pitch decreases in steps from the center of said roller to the ends thereof, each of said steps being defined by a predetermined distance.

24. In a conveyor system including a first pulley means and a second pulley means, a conveyor web supported by said first pulley means and said second pulley means and driven by at least one of said pulley means, and means for rotating at least one of said pulley means to drive the web, an improved pulley means comprising:
  a generally cylindrical roller having helical grooves formed in the outer surface thereof and spiralling from the center of the roller to the ends thereof with decreasing pitch; and
  lengths of belt engaging ribbing material inlaid in said helical grooves and extending beyond said outer surface forming a raised helical coil, one end of each said raised helical coil being affixed within said groove near the center of said roller, the other end of each said raised helical coil being affixed within said groove near one end of said roller, said raised helical coils being operative to engage said web and exert centering forces thereon tending to center said web relative to said pulley means.

25. An improved pulley means as recited in claim 24 wherein said roller tapers slightly from its center to the respective ends thereof.

26. An improved pulley means as recited in claim 24 wherein the surface configuration of said rollers is substantially similar and wherein one of said pulley means is turned end for end 180 degrees relative to the other of said pulley means so that when said pulley means rotate in the same direction said raised helical coils of said first pulley means appear to expand from the center of the roller and said raised helical coils of said second pulley means appear to converge on the center of the roller.

27. An improved pulley means as recited in claim 24 further including a controller pulley means disposed proximate said pulley means and relative thereto such that said web engages said controller pulley means prior to engaging said pulley means, said controller pulley means being operative to engage said web and exert centering forces thereon tending to center said web relative to said controller pulley means.

28. An improved pulley means as recited in claim 27 wherein said controller pulley means may be adjustably disposed proximate said pulley means and relative thereto so as to increase or decrease said centering forces.

29. An improved pulley means as recited in claim 24 wherein said pulley means and said web are disposed relative t each other such that said web continuously engages at least 90 degrees of the surface of one of said pulley means and at least 180 degrees of the surface of the other said pulley means, and further including a third improved pulley means disposed proximate said pulley means and relative thereto such that said web continuously engages approximately 90 degrees of the surface of said third improved pulley means and such that the raised helical coils of said third improved pulley means appear to converge on the center of the roller.

30. An improved pulley means as recited in claim 24 wherein said pulley means and said web are disposed relative to each other such that said web continuously engages at least 90 degrees of the surface of one of said pulley means and at least 180 degrees of the surface of the other said pulley means, and further including a third improved pulley means disposed proximate said pulley means and relative thereto such that said web continuously engages approximately 90 degrees of the surface of said third improved pulley means.

31. An improved conveyor pulley means, comprising:

a generally cylindrical roller having helical grooves formed in the outer surface thereof and spiralling from the center of the roller to the ends thereof with decreasing pitch; and lengths of belt engaging ribbing material inlaid in said helical grooves and extending beyond said outer surface forming a raised helical coil, one end of each said raised helical coil being affixed within said groove near the center of said roller, the other end of each said raised helical coil being affixed within said groove near one end of said roller, said raised helical coils being operative to engage a conveyor web and exert centering forces thereon tending to center said web relative to said pulley means.

* * * * *